Patented May 24, 1938

2,118,140

UNITED STATES PATENT OFFICE 2,118,140

EXTRACTION OF SULPHUR

Robert W. Beattie, Bloomfield, N. J., assignor to Halowax Corporation, New York, N. Y., a corporation of Delaware No Drawing. Application December 24, 1936, Serial No. 117,635

4 Claims. (Cl. 23—228)

This invention relates to the extraction of sulphur and is particularly directed to a method of extracting sulphur from sulphur-containing materials such as sulphur ores, spent gas works oxide and the like.

It has previously been proposed to use certain solvents such as carbon disulphide and acetylene tetrachloride for the extraction of sulphur, but the disadvantages of these materials in practical operation have been so great as to render them economically and technically impractical.

Carbon disulphide has a high vapor pressure, a high inflammability and is very toxic. It boils at 46° C. and at 40° C. a saturated solution contains only about 58% sulphur. It flashes at —20° C. and is liable to spontaneous ignition on exposure to air at 100° C. Vapors coming in contact with a lighted 100 watt electric light bulb are ignited.

Due to its great vapor pressure, there is a great tendency for leakage of vapor and losses in handling and storage. Its high vapor pressure in combination with its high toxicity renders it one of the most dangerous materials used industrially. Industrial carbon disulphide poisoning is chronic and is induced by continuous inhalation of small quantities of the fumes.

Acetylene tetrachloride has a pronounced anaesthetic effect and is extremely toxic to human beings causing jaundice and enlargement of the liver. Due to the low specific heat (0.268) and low latent heat of evaporation of acetylene tetrachloride, it has a very high rate of evaporation, and when used at temperatures high enough to be of any practical effect in the extraction of sulphur its vapor pressure is very high. 100 grams of acetylene tetrachloride will dissolve about 35-37 grams of sulphur at 110° C. and about 55-60 grams at 125° C. At these temperatures the vapor pressures of acetylene tetrachloride are about 275 mm. and 450 mm. of mercury, respectively. Because of these high vapor pressures and the high rate of evaporation, the toxic action on the workmen and the loss of material are very greatly enhanced.

It has now been found that the extraction of sulphur may be safely and economically effected by the use of one or more solvents selected from a group of substances consisting of chlorinated or brominated derivatives of aromatic hydrocarbons, chlorinated or brominated diphenyloxide, and alkyl or hydrogenated derivatives of naphthalene, especially the members of this group which are normally liquid or readily liquefiable. Those compounds which are liquids of relatively low viscosity at room temperature are particularly desirable, but it is to be noted that even those members of the group which in the pure state are solid at room temperature, are frequently liquid in the impure form in which they are technically produced, or may be readily rendered liquid by admixture with other materials.

The compounds of the group defined above are free from the disadvantages of the materials previously proposed for the extraction of sulphur. They are all high boiling and have relatively low vapor pressure over a wide range of temperature. Within that range of temperature they have a high temperature coefficient of solvent power for sulphur. Typically the members of this group of materials dissolve as much as 300% by weight of sulphur at temperatures of 100°-125° C., at which temperatures their vapor pressures are still relatively low, while at room temperatures the solubility of sulphur is very low, typically less than 5%.

The sulphur may be extracted from the sulphur-bearing material by heating the material with the extraction solvent in a suitable vessel to a temperature of, for example, 100° C. or over, thereafter draining, decanting or filtering off the solvent, cooling the solution to room temperature, for example, 15° to 25° C., and draining, decanting or filtering the solvent from the sulphur which crystallizes out.

The method may be operated as a more or less continuous process by causing the hot extraction solvent to leach out the sulphur from the sulphur-bearing material in one or more extraction vessels, continuously or periodically replenished with fresh sulphur-bearing materials, cooling the solution to room temperature, separating the crystallized sulphur, reheating the solvent to extraction temperature and returning the heated solvent to the extraction process.

As an example of a method of extracting sulphur embodying the principles of the invention, a sulphur-bearing ore containing about 200 parts of free sulphur was heated in a covered vessel with 100 parts of a liquid chlorinated naphthalene to 110° C. The extraction solvent used in this example was a chlorination product of naphthalene forming a colorless liquid, boiling at 250–300° C. at atmospheric pressure, a specific gravity of about 1.22 at 20° C., a chlorine content of approximately 25% by weight and a flash point of about 150° C.

After solution was substantially complete the solvent was decanted from the undissolved material and allowed to cool to about 20° C. The sulphur, which separated out in crystalline form, was filtered off. Over 95% of the free sulphur content of the ore was recovered and the recovered extraction solvent contained less than 5% of sulphur.

It is in general advantageous to carry out the extraction at a temperature between 100 and 114° C., as at temperatures below 114° C. the sulphur separates out on cooling in crystalline form, while if the extraction is carried out at temperatures above 114.5° C., the melting point of sulphur, and upon cooling, the solution becomes saturated above this, the sulphur will separate out in liquid form until the temperature drops below 114.5° C.

Instead of the chlorinated naphthalene product used in the specific example described above which consists mainly of alpha- and beta-monochloronaphthalenes together with some dichloronaphthalenes and trichloronaphthalenes, other normally liquid or readily liquefiable members of the hereinbefore defined group may be used, of which typical members are specifically mentioned below:

Of the chlorinated naphthalene products, commercial technical monochloronaphthalene, which is a mixture of alpha-chloronaphthalene and beta-chloronaphthalene, and alpha-chloronaphthalene either alone or in admixture with dichloronaphthalene are particularly useful.

Chlorine substitution products of benzene either singly or mixed, which are liquid or readily liquefiable at room temperature (18–25° C.) are also useful. For example, commercial trichlorobenzene which boils at about 213–217° C., has a specific gravity of 1.45 at 20° C. and consists of about 85–90% of 1:2:4 trichlorobenzene and 10–15% of 1:2:3-trichlorobenzene, is very suitable. It dissolves over 300 parts by weight of sulphur in each 100 parts of solvent at 100° C. and only 3 parts by weight of sulphur in 100 parts of solvent at room temperature.

Monochlorobenzene may also be used as 100 parts of this solvent and will dissolve 75 parts of sulphur at 111° C. It is, however, not as suitable as trichlorobenzene.

Liquid or readily liquefiable chlorinated substitution products of diphenyl are also suitable solvents for use in the invention. They typically have specific gravities of 1.17 to 1.52 at 20° C., chlorine contents of 19–54% and boil at from 270°–390° C., at atmospheric pressure. They are usually distilled under reduced pressure.

For example, a product corresponding closely in composition to a trichlorodiphenyl, has a specific gravity of 1.33 at 20° C., a boiling range of 295°–345° C. and a chlorine content of about 45%. 100 parts of this material at room temperature dissolves less than 5 parts by weight of sulphur, at 100° C. 35 parts, at 108° C. 63 parts, and at 115° C. at least 320 parts. The flash point of this material is above 165° C.

Chlorinated diphenyl containing about 54% chlorine, having a specific gravity of about 1.52–1.535 at 65° C. and a boiling point of 352°–381° C. is also very useful. 100 parts of this material at 109° C. will dissolve 100 parts of sulphur, at 110° C. 200 parts of sulphur and at 112° C. 250 parts of sulphur. At room temperatures the solubility of sulphur in the material is very low.

Bromine substitution products of naphthalene or mixtures thereof which are liquid or readily liquefiable at ordinary temperatures are suitable for use in the method of the invention. 100 parts of monobromonaphthalene at 100° C. will dissolve 204 parts by weight of sulphur, and at 110° C. will dissolve at least 455 parts, but at room temperatures will only dissolve 5 to 7 parts of sulphur. Pure alpha-bromonaphthalene or mixtures thereof with beta-bromonaphthalene may be used.

Brominated diphenyl and brominated benzene may also be used in the practice of the invention. 100 parts of a low melting brominated diphenyl dissolved 350 parts of sulphur at 111° C.

Chlorine substitution products of diphenyl oxide ranging in chlorine content from that corresponding to monochlorodiphenyloxide to hexachlorodiphenyloxide including all intermediate compositions and mixtures thereof which are liquids or low-melting solids may also be used. For example, 100 parts of distilled chlorination product of diphenyloxide corresponding in chlorine content to about trichlorodiphenyloxide, containing about 38% chlorine and being a thin liquid at ordinary temperatures, will dissolve at 100° C. 26 parts of sulphur, at 112° C. 50 parts of sulphur and at 120° C. 70 parts of sulphur. At room temperatures 100 parts of this liquid dissolves less than 5 parts of sulphur.

A chlorination product corresponding in chlorine content to hexachlorodiphenyloxide will dissolve at 107° C. 50 parts of sulphur and at 111° C. 150 parts of sulphur. This material has a specific gravity of about 1.53–1.55 at 100° C. and a chlorine content of about 56.5%. Brominated diphenyloxide may also be used.

Mixed halogenated aromatic compounds containing at least one chlorine atom and at least one bromine atom in nuclear substitution in the molecule are useful in practicing the invention. For example, 100 parts of a liquid obtained by the bromination of ortho-chlorodiphenyl will dissolve at least 400 parts of sulphur at 100° C. Chlorobromonaphthalenes, chlorobromobenzenes and chlorobromodiphenyloxides are also suitable, as well as other chlorobromodiphenyls.

Chlorination or bromination products of phenanthrene that are liquids or low melting solids may also be used. For example, 100 parts of a liquid phenanthrene chlorination product containing about 23% of chlorine dissolves at least 200 parts of sulphur at temperatures over 100° C.

Liquid or readily liquefiable compounds in which chlorine or bromine or both are substituted in an aromatic or hydroaromatic nucleus which also contains one or more alkyl or aryl groups, such as methyl, ethyl, phenyl, diphenyl and the like attached to the nucleus, are also useful in the invention. For example, nuclear halogenated derivatives of methyl naphthalene, toluene, xylene, retene, phenyldiphenyl and the like may be used. Similarly aromatic and hydroaromatic compounds containing halogen substituted alkyl or aryl groups of the general formula, $R_1.R_2.Hal$ where $R_1$ is an aromatic or hydroaromatic ring and $R_2$ is an alkyl or aryl group may be used. The aromatic or hydroaromatic ring may also be substituted by halogen.

The extraction solvent may also comprise a liquid or readily liquefiable alkyl naphthalene, for example, alpha-methyl naphthalene, or mixtures thereof with beta-methyl naphthalene or with di-methyl naphthalenes or mixtures of di-methyl naphthalenes. For example, 100 parts of technical alpha-methyl naphthalene dissolves 80 parts of sulphur at 100° C. and at least 290 parts of sulphur at 108° C., but less than 5 parts of sulphur at room temperatures.

Liquid hydrogenation products of naphthalene such as tetralin (tetra-hydronaphthalene) and decalin (deca-hydronaphthalene) are also useful. 100 parts of these solvents dissolve large quantities of sulphur at temperatures above 100° C., but dissolve less than 5 parts of sulphur per 100 parts of solvent at room temperatures.

I claim:

1. A method of extracting sulphur from sulphur-containing materials which comprises treating the sulphur-containing material with a low-melting, high-boiling member of the group consisting of halogenated polynuclear aromatic compounds, trichlorobenzene, alkyl naphthalenes and mixtures thereof at a temperature above 100° C., separating the solution from undissolved material, cooling the separated solution to a temperature at which a substantial proportion of the dissolved sulphur separates from the solution and separating the sulphur from the mother liquor.

2. A method of extracting sulphur from sulphur-containing materials which comprises treating the sulphur-containing material with a low-melting, high-boiling halogenated polynuclear aromatic compound at a temperature above 100° C., separating the solution from undissolved material, cooling the solution to a temperature at which a substantial proportion of the dissolved sulphur separates from the solution and separating the sulphur from the mother liquor.

3. A method of extracting sulphur from sulphur-containing materials which comprises treating the sulphur-containing material with trichlorobenzene at a temperature above 100° C., separating the solution from undissolved material, cooling the solution to a temperature at which a substantial proportion of the dissolved sulphur separates from the solution and separating the sulphur from the mother liquor.

4. A method of extracting sulphur from sulphur-containing materials which comprises treating the sulphur-containing material with a low-melting, high-boiling alkyl naphthalene at a temperature of at least about 100° C., separating the solution from undissolved material, cooling the solution to approximately 15° to 25° C., and separating the sulphur from the mother liquor.

ROBERT W. BEATTIE.